(12) United States Patent
Greene

(10) Patent No.: US 9,127,725 B2
(45) Date of Patent: Sep. 8, 2015

(54) SWITCHABLE WATER PUMP WITH DUAL FRICTION PLATE ACTUATION

(75) Inventor: Darrell F. Greene, Bradford (CA)

(73) Assignee: Magna Powertrain Inc., Ontario (CA)

(*) Notice: Subject to any disclaimer, the term of this patent is extended or adjusted under 35 U.S.C. 154(b) by 0 days.

(21) Appl. No.: 14/234,828

(22) PCT Filed: Jul. 27, 2012

(86) PCT No.: PCT/CA2012/000714
§ 371 (c)(1),
(2), (4) Date: Jan. 24, 2014

(87) PCT Pub. No.: WO2013/020211
PCT Pub. Date: Feb. 14, 2013

(65) Prior Publication Data
US 2014/0144745 A1    May 29, 2014

Related U.S. Application Data

(60) Provisional application No. 61/512,214, filed on Jul. 27, 2011.

(51) Int. Cl.
| F16D 27/14 | (2006.01) |
| F16D 27/112 | (2006.01) |
| F01P 5/12 | (2006.01) |
| F02B 67/06 | (2006.01) |
| F01P 7/16 | (2006.01) |

(52) U.S. Cl.
CPC ............... *F16D 27/112* (2013.01); *F01P 5/12* (2013.01); *F01P 7/162* (2013.01); *F02B 67/06* (2013.01); *F16D 27/14* (2013.01)

(58) Field of Classification Search
None
See application file for complete search history.

(56) References Cited

U.S. PATENT DOCUMENTS

| 2,816,636 | A | * | 12/1957 | Weibel, Jr. .................. 192/35 |
| 4,187,938 | A |   | 2/1980  | Miller |
| 4,445,596 | A | * | 5/1984  | Waters et al. ............... 188/171 |

(Continued)

FOREIGN PATENT DOCUMENTS

| CA | 238775 | 3/1924 |
| CA | 2319253 | 8/2009 |

(Continued)

*Primary Examiner* — Ramya Burgess
*Assistant Examiner* — Mark Manley
(74) *Attorney, Agent, or Firm* — Warn Partners, P.C.

(57) ABSTRACT

An electromagnetic clutch includes a rotatable input member or pulley and a rotatable output member or shaft. A hub cover is coupled to the pulley and includes an inner facing surface located proximal an outer friction pad or clutch plate which is fixed for rotation with the output member. An armature plate is axially moveable relative to the output member and is biased toward a position of engaging the clutch plate and the hub cover for transferring a torque from the pulley to the output shaft. A self-energizing actuator converts rotary motion of the input member or pulley to linear movement of the armature plate to further engage the clutch. The actuator includes a biasing member urging relative rotation between the one of the input member and the output member and the armature plate to initially engage the armature plate and the clutch plate. An electromagnet is provided for axially translating the armature plate away from the friction plate to disengage the clutch plate from the hub cover thereby disengaging the input force from the pulley. The clutch plate is coupled to the shaft using a splined coupling which does not prevent axial movement of the clutch plate on the shaft.

14 Claims, 2 Drawing Sheets

(56) References Cited

U.S. PATENT DOCUMENTS

| | | |
|---|---|---|
| 5,195,625 A | 3/1993 | Chang et al. |
| 5,372,106 A | 12/1994 | Botterill |
| 5,505,285 A | 4/1996 | Organek |
| 5,651,437 A | 7/1997 | Organek et al. |
| 5,810,141 A | 9/1998 | Organek et al. |
| 5,819,883 A | 10/1998 | Organek et al. |
| 5,931,272 A | 8/1999 | Fukushima et al. |
| 5,943,911 A * | 8/1999 | Beckerman ............ 74/333 |
| 5,960,916 A | 10/1999 | Organek et al. |
| 5,979,630 A | 11/1999 | Nyquist et al. |
| 6,044,943 A | 4/2000 | Bytzek et al. |
| 6,092,633 A | 7/2000 | Morisawa |
| 6,286,650 B1 | 9/2001 | Tabuchi et al. |
| 6,352,147 B1 | 3/2002 | Orlamunder et al. |
| 6,571,924 B2 | 6/2003 | Murata et al. |
| 6,588,559 B2 | 7/2003 | Blair |
| 6,823,974 B2 | 11/2004 | Hayashi |
| 7,699,740 B2 | 4/2010 | Gassmann et al. |
| 7,866,226 B2 | 1/2011 | Weule |
| 8,387,767 B2 * | 3/2013 | Komorowski et al. .......... 192/90 |
| 2008/0099300 A1 | 5/2008 | Youngwerth et al. |
| 2010/0126822 A1 | 5/2010 | Winkler et al. |
| 2011/0005476 A1 | 1/2011 | Park |
| 2011/0036678 A1 | 2/2011 | Hashizume et al. |

FOREIGN PATENT DOCUMENTS

| | | |
|---|---|---|
| CN | 201265609 | 7/2009 |
| DE | 19914937 | 10/1999 |
| JP | 2010-101441 | 5/2010 |
| JP | 2010-112442 | 5/2010 |
| KR | 20040036386 | 4/2004 |
| KR | 20040085723 | 10/2004 |
| WO | 2010/148507 | 12/2010 |

* cited by examiner

SWITCHABLE WATER PUMP WITH DUAL FRICTION PLATE ACTUATION

CROSS REFERENCE TO RELATED APPLICATIONS

This application is a National Stage of International Application No. PCT/CA2012/000714, filed Jul. 27, 2012 which claims the benefit of, and incorporates herein by reference for all purposes, U.S. Provisional Patent Application No. 61/512,214 filed on Jul. 27, 2011.

FIELD

The present disclosure relates generally to a clutch mechanism for use with a pump assembly. More particularly, the present disclosure relates to a selectively-operable, self-actuating, clutch mechanism having particular application in a water pump of a lubrication system in an internal combustion engine of a vehicle.

BACKGROUND

It is generally known to provide an internal combustion engine including a pump assembly for pumping fluid through the engine, such as to operate a water pump to pump a cooling fluid through the engine to transfer heat from the engine. Pumps for incompressible fluids, such as oil and water, are often either gear pumps or vane pumps. In environments such as automotive engine systems, where are power take off (such as a belt pulley) is used to operate these pumps, the pumps will necessarily operate over a wide range of speeds, as the engine operating speed changes the pump changes speed resulting in changes in the output volume and the output pressure of the fluid exiting the pump.

In such devices, it is generally known to provide an electromagnetic clutch for selectively operating the pump. For example, one such device is disclosed in the international publication WO2010/148507 (A1), published Dec. 29, 2010, from international application number PCT/CA/2010/000978, filed Jun. 21, 2010, naming inventor Darrell F. Greene and commonly assigned with this application, then entire contents of which are incorporated herein by reference for all purposes. While the clutch of the '978 international application has particular applicability, there remains a need to continue to improve such devices. In particular, the clutch device and water pump combination of the international application include an undesirable and involved tolerance stack. Further, the axis of rotation of the hub (outer or external bearing) and the driven plate (inner or shaft bearing) is imperfect due to tolerances. This can cause the driven plate to orbit the hub rotation which can be perceived as the clutch "slipping" as the input and output speeds of rotation will be slightly different. Further, in the disclosed clutch device of the '978 international application, the press fit of the clutch pad on the shaft relative to the hub cannot insure the friction surfaces are perfectly parallel. This can result in uneven contact pressure on the friction plate and can lead to wear-reduced capacity or slipping. Further, the assembly of the disclosed device of the '978 international application can be challenging since the position of the output clutch plate along the length of the shaft is significant in setting the gap of the input plate and electromagnet. If the gap is too large, the clutch device can experience lower performance when disengaging. Accordingly, it is desirable to improve the ease of assembly of the clutch device in manufacturing while maintaining a highly accurate and consistent tolerance gap in the electromagnetic components and clutch assembly.

SUMMARY

This section provides a general summary of the disclosure, and is not a comprehensive disclosure of its full scope or all of its features. In one exemplary embodiment, an electromagnetic clutch includes a rotatable input or driving member or pulley and a rotatable output or driven member or shaft. In one exemplary embodiment, a hub cover can be coupled to the rotatable input member or pulley and includes an inner facing surface located proximal an outer friction pad or clutch plate which can be fixed for rotation with the output member or shaft. An armature plate can be axially moveable relative to the output member and can be biased toward a position of engaging the clutch plate and the hub cover for transferring a torque from the pulley to the output shaft. A self-energizing actuator converts rotary motion of the input member or pulley to linear movement of the armature plate to further engage the clutch. The actuator includes a biasing member urging relative rotation between the one of the input member and the output member and the armature plate to initially engage the armature plate and the clutch plate. An electromagnet can be provided for to axially translating the armature plate away from the friction plate to disengage the clutch plate from the hub cover thereby disengaging the input force from the pulley.

The clutch device of the present disclosure has particular utility as part of a water pump for use in an engine in an automobile. The clutch device of the present disclosure can have applicability in other devices, particularly those in a vehicle using a power take off from the engine such as a belt which can be used to drive other accessories such as an oil pump or alternator. Further areas of applicability will become apparent from the detailed description provided herein. The detailed description and specific examples in this summary are intended for purposes of illustration only and are not intended to limit the scope of the present disclosure except if expressly stated herein.

DETAILED DESCRIPTION

Figure 1:
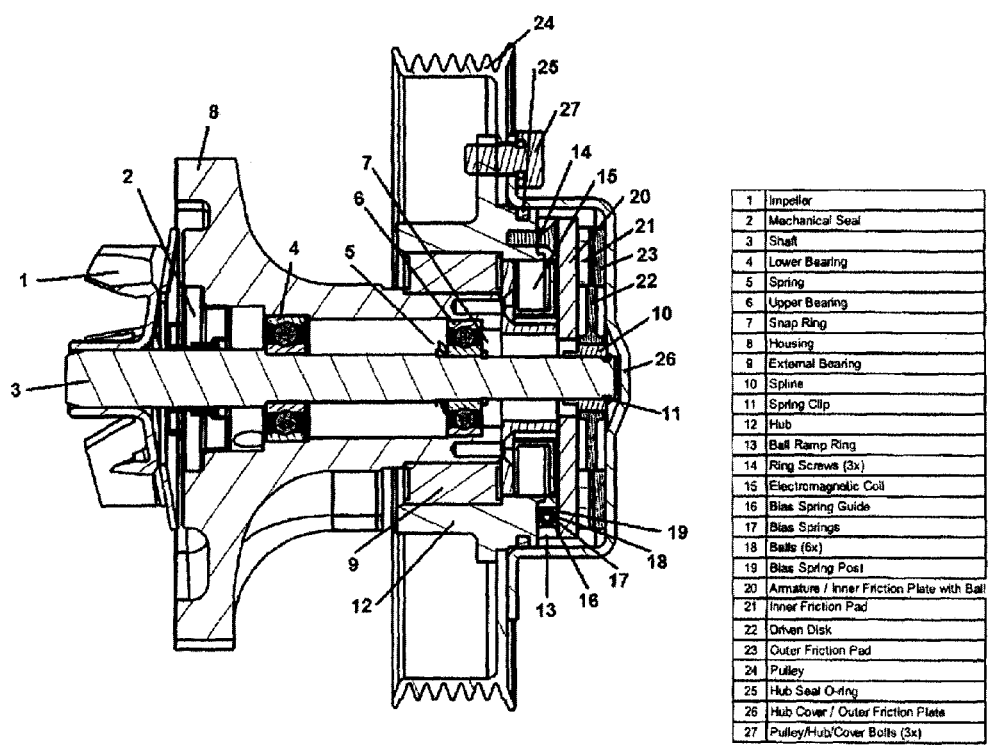
FIG. 1 is a cross-sectional view of an electromagnetic clutch device according to one exemplary embodiment wherein the clutch device can be associated with a portion of an exemplary water pump device for use with an engine in an automobile.
Figure 2:
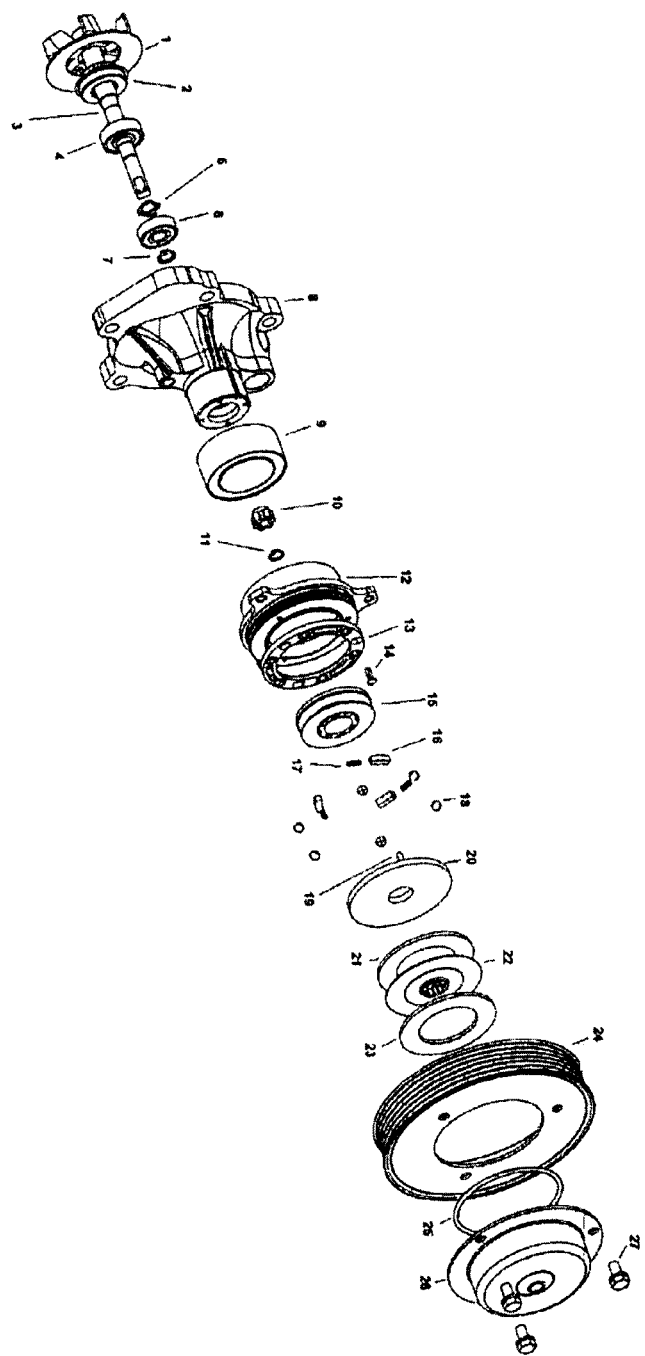
FIG. 2 is an exploded perspective view of the electromagnetic clutch device according to the exemplary embodiment of FIG. 1.

Referring to all of the figures in general, and in particular to FIGS. 1 and 2 there is disclosed a new design for an electromagnetic clutch mechanism or device useful with a water pump (partially shown) of an engine (not shown) such as those used in a vehicle or automobile (not shown) and in particular for use in an engine (not shown) in a passenger vehicle (not shown). The electromagnetic clutch device has particular use in a water pump (partially shown) for use in an engine (not shown) of a passenger vehicle (not shown) but can be applicable with any similar device wherein an input torque is to be controlled and transferred to a rotating device, such as a pump.

The electromagnetic clutch mechanism can be coupled to a housing 8 of the water pump (partially shown) for rotating an impeller 1 of the water pump which can be coupled to one end of an output member of shaft 3 which can be supported in the housing 8 by a lower bearing 4 and an upper bearing 6.

The clutch mechanism of the present disclosure eliminates any need for a bolt on the end of the shaft 3 for coupling the driven disk 22 of the clutch mechanism to the output shaft 3 and instead allows the driven disk 22 to float along the length of the output shaft 3 via the spline member 10. The armature or inner friction plate 20 can be biased toward engagement by the ball ramp ring 13 and its associated bias springs 17 to engage the clutch mechanism and to thereby transfer a torque applied to the pulley 24 and the hub 12 to the output shaft 3 through the clutch mechanism. When there is a desire or need to disengage the clutch mechanism, a controller (not shown) of any known or appropriate type signals the electromagnetic coil 15 to energize to move the armature or inner friction plate 20 away from the engagement position, such that outer friction pad 23 will no longer engage the dust cover 26 and the torque will no longer be transferred to the output shaft 3 and onto the load of the pump via the impeller 1.

The improved clutch mechanism of the present disclosure has the benefit of transferring the function of controlling the length of the gap of the clutch mechanism to existing components—the dust cover 26 (i.e., it eliminates the tolerance stack associated with numerous other parts in other designs). Since the surface or friction pad 23 of the output plate or driven disk 22 presses against the inner surface of the dust cover 26, the previous tolerance stack-up issue is effectively eliminated. Accordingly, the design of the electromagnetic clutch shown in FIGS. 1 and 2 is far more accommodating to accurately and consistently controlling the gap and the associated tolerance stack-up of the clutch mechanism since the output plate or driven disk 22 and its friction plates 21 and 23 and the hub cover 26, coupled to the hub 12, sets the gap of the clutch mechanism. The result is the output plate 22 can be squeezed between the armature or input plate 20 and the hub cover 26 to engage the clutch mechanism.

Further, the installation of the present design clutch mechanism is now, comparatively, very simple. In one exemplary embodiment, as best shown in FIG. 2, the plate or driven disk 22 can be simply placed on preferably a splined bushing 10 placed along the shaft 3 and coupled thereto by a spring clip 11 and then the dust cover 26 can be coupled (such as by fastening or any other appropriate simple and efficient attaching mechanism) to hub 12 to which the pulley 24 can be also coupled. Because the dust cover 26 can be mounted directly to the hub 12, the installation length or gap can be much easier to control resulting in significantly improved and consistent gap control over which the electromagnetic coil 15 must operate.

As can be noted, in the exemplary embodiment of the clutch mechanism shown in FIGS. 1 and 2, an input torque from the pulley 24 can be transferred to the hub 12 and then transferred to the cover plate 26 to the clutch mechanism. The torque can be transferred from both sides of the clutch plate 22 to the load (i.e., the impeller 1 and the pump) via the output shaft 3. In the clutch mechanism there can be an inner side associated with the ball ramp ring 13 and an outer side associated with the hub cover 26. In this embodiment, if the friction interface of both sides (inner and outer) of the clutch mechanism can be the same) the torque will be balanced or shared equally. In this embodiment, the impact-sensitive ball-ramps of the ball ramp ring 13 will only experience half of the forces as compared to the a single-sided version of the clutch mechanism.

It is believed, significantly, that only torque transferred by the friction interface of the clutch mechanism on the inner (i.e., ball-ramp) side associated with that armature or inner friction plate 20 is converted to a clamping pressure within the clutch mechanism. While both sides experience the same clamping pressure, the friction plate or driven disk 22 is "floating" between the input and output friction surfaces (it is not constrained axially on the shaft).

In an alternate embodiment, the inner and outer friction surfaces 21 and 23, respectively, may have different coefficients of friction for tuning the operation of the clutch. For example, in one exemplary alternate embodiment, the outer surface 23 may have a much lower coefficient of friction than the inner surface 21 to make the dynamics on the ball-ramp 13 more like that of a single-sided friction clutch mechanism version while keeping the advantage of a design having virtually no axial force load on the bearings 4 and 6 supporting the shaft 3.

In this case, the clamping force of the clutch mechanism, provided by the ball ramps 13 as the torque increases and the balls overcome the biasing force of the springs 17, can be much higher but the torque can be unevenly shared (greater amount carried by the inner surface 21). An advantage to doing this may be allowing the outer friction surface 23 to "pre-engage" the clutch mechanism before the inner surface 21 takes the bulk of the torque (i.e., to provide a clutch mechanism having a soft engagement or a "two-stage" engagement). Such an embodiment of a clutch mechanism may be used to help limit or reduce objectionable noise during initial engagement of the clutch mechanism. It is also understood that such a design may also be achieved by using different coefficients of friction surfaces as well as by using differing materials or geometries most notably the inner diameter of the friction ring.

The outer friction surface 23 could also be made to have a much higher coefficient of friction to reduce the torque carried by the inner friction surface or side 21 and the clamping pressure (hence forces on the ball ramps 13) will also be reduced. Initial calculations show a very interesting and unexpected potential benefit: the overall dynamics of the clutch mechanism and system self-regulate. When the clamping forces of the clutch mechanism are reduced, it is believed the torque capacity of the clutch mechanism will not be reduced if the outer friction surface 23 properties are increased in proportion.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A clutch mechanism that is part of a water pump for selectively engaging an input member with an output member, the clutch mechanism comprising:
   a clutch plate selectively engageable with the input member and said clutch plate is rotatably coupled to the output member;
   an armature plate axially moveable relative to the input member and the output member;
   an actuator coupled with the input member for converting rotary motion of the input member to linear movement of the armature plate wherein the actuator has a biasing device that provides a biasing force;
   a hub cover coupled to rotate with the input member;
   an inner friction plate and an outer friction plate coupled to opposing sides of the clutch plate, wherein said inner friction plate is engageable with the armature plate and the outer friction plate is engageable with the hub cover;
   a gap of the clutch mechanism over which the clutch mechanism must operate to engage or disengage the clutch mechanism determined by the distance between the hub cover, outer friction plate, clutch plate and inner friction plate;
   an electromagnetic coil disposed within the clutch and coupled to the armature plate wherein when the electromagnetic coil is energized the armature plate is moved in a direction opposite the biasing force of the biasing device to overcome the biasing force of the actuator to disengage the clutch such that torque applied to the input member is not transferred to the output member and when the electromagnetic coil is deenergized the clutch plate is squeezed between the armature plate and the hub cover to engage the clutch mechanism so that the inner friction plate engages the armature plate and the outer friction plate engages the hub cover;
   a water pump impeller coupled to the output member wherein said clutch mechanism is part of a water pump and said water pump impeller pumps water through a cooling system in an engine.

2. The clutch mechanism of claim 1 further comprising a pulley coupled to the input member.

3. The clutch mechanism of claim 1 wherein the clutch plate has a disc shape and the output member is a shaft including an axial spline thereon and the disc shape clutch plate includes a spline and is rotatably coupled to the axial spline of the shaft.

4. The clutch mechanism of claim 3 wherein the spline coupling between the shaft and the clutch plate does not limit axial movement of the clutch plate on the shaft.

5. The clutch mechanism of claim 1 wherein the clutch plate and the output member are coupled using a splined bushing which does not limit axial movement of the clutch plate with respect to the output member.

6. The clutch mechanism of claim 1 wherein the clutch plate and the output member are coupled using a splined bushing which does not limit axial movement of the clutch plate with respect to the output member and the splined bushing is coupled to the output member by a spring clip.

7. The clutch mechanism of claim 6 further comprising a pulley coupled to the hub cover.

8. The clutch mechanism of claim 7 wherein the hub cover comprises a dust cover mounted directly to a hub to reduce a length or gap and provide improved control of the clutch mechanism.

9. An electromagnetic clutch that is part of a water pump comprising:
   a rotatable input member;
   a rotatable output member including a shaft;
   a clutch plate coupled to the shaft using a splined bushing which does not limit axial movement of the clutch plate with respect to the shaft wherein said clutch plate is selectively engageable with the rotatable input member and said clutch plate is rotatably coupled to the output member;
   an armature plate axially moveable relative to the input member and the output member; and
   an actuator for converting rotary motion of the input member to linear movement of the armature plate, wherein the actuator includes a biasing device for providing a biasing force for urging relative rotation between the other of the input member and the output member and the armature plate to initially engage the armature plate and the clutch plate, the actuator providing an additional clutch engagement force once the input member is driven;
   a hub cover coupled to rotate with the input member;

an inner friction plate and an outer friction plate coupled to opposing sides of the clutch plate, wherein said inner friction plate is engageable with the armature plate and the outer friction plate is engageable with the hub cover;

a gap of the clutch mechanism over which the clutch mechanism must operate to engage or disengage the clutch mechanism determined by the distance between the hub cover, outer friction plate, clutch plate and inner friction plate;

an electromagnetic coil disposed within the clutch and coupled to the armature plate wherein when the electromagnetic coil is energized the armature plate is moved in a direction opposite the biasing force of the biasing device to overcome the biasing force of the actuator to disengage the clutch such that torque applied to the input member is not transferred to the output member and when the electromagnetic coil is deenergized the clutch plate is squeezed between the armature plate and the hub cover to engage the clutch mechanism so that the inner friction plate engages the armature plate and the outer friction plate engages the hub cover;

a water pump impeller coupled to the output member wherein said clutch mechanism is part of a water pump and said water pump impeller pumps water through a cooling system in an engine.

10. The electromagnetic clutch of claim 9 wherein the splined bushing is coupled to the shaft by a spring clip.

11. The electromagnetic clutch of claim 10 wherein the rotatable input member further includes a pulley and the hub cover is coupled to the pulley.

12. The electromagnetic clutch of claim 11 wherein the hub cover comprises a dust cover mounted directly to a hub to reduce the gap and provide improved control of the clutch mechanism.

13. The electromagnetic clutch of claim 9 further comprising a pulley coupled to the hub.

14. The electromagnetic clutch of claim 9 further comprising:

member wherein the splined bushing connection between the clutch plate and the shaft allows the clutch plate to float between the armature plate and the hub.

* * * * *